UNITED STATES PATENT OFFICE.

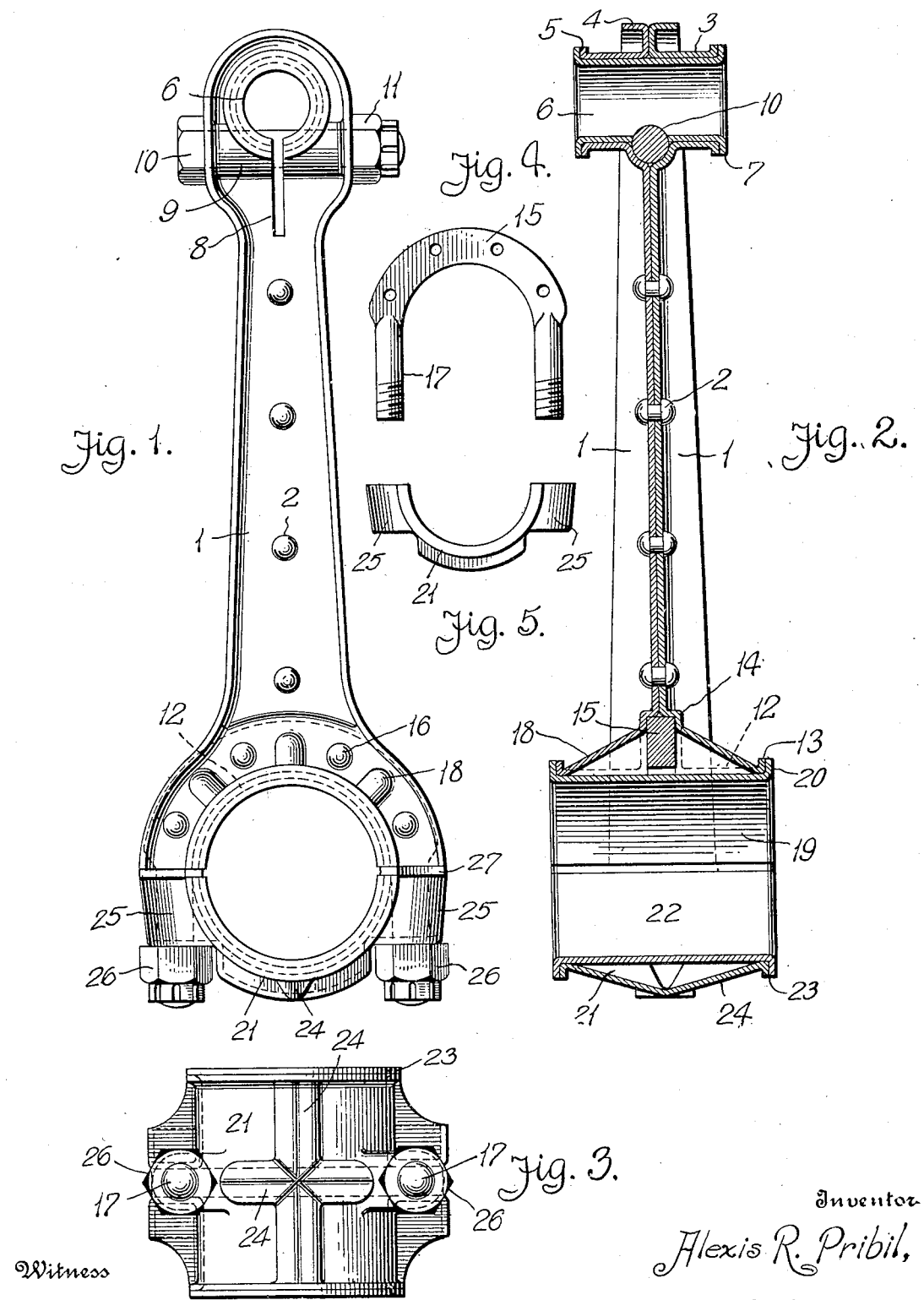

ALEXIS R. PRIBIL, OF WILKINSBURG, PENNSYLVANIA.

CONNECTING-ROD.

1,308,992.   Specification of Letters Patent.   Patented July 8, 1919.

Application filed July 12, 1917. Serial No. 180,053.

*To all whom it may concern:*

Be it known that I, ALEXIS R. PRIBIL, a citizen of the United States of America, residing at Wilkinsburg, in the county of Allegheny and State of Pennsylvania, have invented certain new and useful Improvements in Connecting-Rods, of which the following is a specification, reference being had therein to the accompanying drawings.

This invention relates to connecting rods and has special reference to that type of rod disclosed in my pending application filed Dec. 26, 1916, Serial No. 138,955. In this particular application there is shown a rod constructed from pressed steel parts and ordinary bolts and nuts are employed for holding parts of the crank shaft bearing of the rod together, without the bolts serving other than as connecting means.

The primary object of the present invention is to utilize novel U bolts or stirrup members for connecting the parts of the crank shaft bearing of the rod so that the U bolts will brace and stiffen parts of the bearing, particularly those parts subjected to stresses and strains which have a tendency to fracture the rod, particularly between the crank shaft bearing and shank of the rod.

Another object of my invention is to provide a connecting rod fabricated from pressed steel and having the parts thereof mechanically articulated in contradistinction to spot welding, brazing or riveting, the articulation of the parts being affected by special shapes, particularly in connection with bushings or bushing parts of the rod.

A further object of my invention is to provide connecting rods, one having a crank shaft bearing disposed between other parts of the rod, and crank shaft bearing of the other rod, and the separated parts of the crank shaft bearing articulated against further separation or displacement. Such construction permits of the crank shaft bearings of two or more rods being compactly disposed on a crank shaft, and this arrangement is a desideratum in connection with a V type engine.

A still further object of my invention is to accomplish the above results by a simple, durable and inexpensive construction that will be hereinafter specifically described and then claimed, and reference will now be had to the drawings, wherein—

Figure 1 is a side elevation of a connecting rod;

Fig. 2 is a vertical cross-sectional view of the same;

Fig. 3 is a bottom plan view of the connecting rod showing the driving end thereof, and more particularly the crank shaft bearing;

Fig. 4 is a side elevation of a detached U bolt and

Fig. 5 is a side elevation of a detached cap.

The shank of the connecting rod is formed of two tapering channel members 1 disposed back to back and connected by rivets 2 or other fastening means, so that the shank of the connecting rod will have a cross section similar to an I-beam. The small end of the shank terminates in a driving end construction and the large end of the shank terminates in a driven end construction or a crank shaft bearing. At the driving end of the shank, the members 1 are provided with pressed out sleeves 3, which aline and are surrounded by the flanges 4 of the members 1. The outer ends of the sleeves 3 have peripheral flanges 5, and mounted in said sleeves is a bushing 6, said bushing having the ends thereof flared, reamed or flanged, as at 7 so that said bushing will hold the members 1 in contact at the driven end of the shank. The bushing 6 constitutes a large hollow rivet connecting the driven ends of the members 1 and said bushing is adapted to receive a piston pin (not shown). The members 1, at the sleeves 3, are bifurcated or slotted, as at 8 and are formed with transverse semi-cylindrical sleeves 9 to receive a bolt 10 provided with a nut 11 that may be tightened against the flanges 4 to contract the sleeves 3 about the piston pin, such contraction or spring of the sleeve 3 being permissible by virtue of the bifurcation or slot 8. The bushing 6 is necessarily slotted to provide clearance for the bolt 10 and said bolt is adapted to extend into a groove of the piston pin and thereby prevent shifting of the bushing or the driven end of the connecting rod longitudinally of the piston pin to which it is connected.

Considering the driven end of the rod which terminates in a crank shaft bearing, the members 1 are enlarged and provided with pressed out alining semi-cylindrical sleeves 12 and these semi-cylindrical sleeves have the outer ends thereof provided with flanges 13. At the juncture of the members 1 with the semi-cylindrical sleeves 12, there are offset portions 14 providing a semi-cylindrical pocket for a U bolt 15 which is held within the pocket and is fixed relative to the shank of the connecting rod by a plurality of rivets 16 or other fastening means.

The U-bolt 15 has threaded bolt portions or stems 17 depending from the longitudinal edges of the semi-cylindrical sleeves 12 and these sleeves are provided with pressed out ribs 18 extending from the outer ends of the sleeves to the offset portions 14 of the members, as best shown in Fig. 2, said ribs adding rigidity to the semi-cylindrical sleeves and bracing the U-bolt 15 relative to the shank of the connecting rod. In the semi-cylindrical sleeves 12 is placed a semi-cylindrical bushing 19 and said bushing has its ends flared, reamed or flanged, as at 20, so as to tie the semi-cylindrical sleeves 12 together against any spreading action.

To complete the crank shaft bearing there is a cap composed of a semi-cylindrical sleeve 21 and a semi-cylindrical bushing 22, both of which have the ends thereof flanged, as at 23. The lower side of the semi-cylindrical sleeve 21 has longitudinal and transverse pressed out ribs 24 adding rigidity to said sleeves, particularly between the end flanges thereof, as best shown in Fig. 3. The sides of the semi-cylindrical sleeve 21 are provided with pressed out apertured bosses 25 to receive the threaded stem 17 of the U-bolt and nuts 26 are screwed upon the U-bolt to hold the caps in position so that the semi-cylindrical bushings 19 and 22 will coöperate as a bearing for the crank portion of a shaft. A shim or washer 27 is placed between the detachable cap and the fixed portion of the crank shaft bearing. With the U-bolt 15 sandwiched between the enlarged ends of the members 1 and in the longitudinal axis of the connecting rod a very durable and strong construction is provided for the fixed portion of the crank shaft bearing. With the semi-cylindrical sleeves 12 of this portion of the bearing devoid of bosses and strengthened by the ribs 18, it is practically impossible for this part of the connecting rod to become fractured or cracked, particularly at the juncture of the semi-cylindrical sleeves 12 with the shank of the connecting rod, such points having heretofore been considered the weakest part of a rod.

What I claim is:—

1. A connecting rod having a crank shaft bearing provided with a detachable cap, and a U-bolt having its head permanently fixed in the longitudinal axis of said rod and connecting said cap thereto.

2. A connecting rod comprising a shank, a crank shaft bearing having a detachable cap, and a U-bolt permanently held by said shank connecting said cap to said bearing.

3. A connecting rod comprising a shank, a crank shaft bearing having a detachable cap, and a U-bolt having its head in the axis of said shank straddling said bearing and connecting said cap to said bearing.

4. A connecting rod comprising two twin halves secured together and having a crank shaft bearing, and a U-bolt having its middle portion secured in the plane of the juncture of the said halves.

In testimony whereof I affix my signature in the presence of two witnesses.

ALEXIS R. PRIBIL.

Witnesses:
 KARL H. BUTLER,
 ANNA M. DORR.